US011292894B2

(12) United States Patent
Cuypers et al.

(10) Patent No.: US 11,292,894 B2
(45) Date of Patent: Apr. 5, 2022

(54) COMPOSITE MATERIAL FOR HEAT STORAGE, METHOD FOR PREPARATION AND USE

(71) Applicant: Nederlandse Organisatie voor toegepast-natuurwetenschappelijk onderzoek TNO, 's-Gravenhage (NL)

(72) Inventors: Ruud Cuypers, 's-Gravenhage (NL); Adriaan Jan De Jong, 's-Gravenhage (NL); Jacobus Eversdijk, 's-Gravenhage (NL); Hendrik Pieter Oversloot, 's-Gravenhage (NL); Johannes Christiaan Van 'T Spijker, 's-Gravenhage (NL); Nicole Ellen Papen-Botterhuis, 's-Gravenhage (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/356,495

(22) Filed: Mar. 18, 2019

(65) Prior Publication Data
US 2019/0211188 A1  Jul. 11, 2019

Related U.S. Application Data

(63) Continuation of application No. 14/654,970, filed as application No. PCT/NL2013/050953 on Dec. 24, 2013, now Pat. No. 10,266,679.

(30) Foreign Application Priority Data

Dec. 27, 2012  (EP) .................... 12199509
Jun. 20, 2013  (EP) .................... 13173103

(51) Int. Cl.
| | | |
|---|---|---|
| *C09K 5/00* | (2006.01) | |
| *C08K 9/10* | (2006.01) | |
| *C08K 3/16* | (2006.01) | |
| *C09K 5/16* | (2006.01) | |
| *C09K 5/06* | (2006.01) | |
| *C08K 3/12* | (2006.01) | |
| *C08K 13/02* | (2006.01) | |
| *C08K 13/04* | (2006.01) | |
| *C08L 75/00* | (2006.01) | |
| *C08L 25/00* | (2006.01) | |
| *C08L 63/00* | (2006.01) | |
| *C08L 33/00* | (2006.01) | |

(52) U.S. Cl.
CPC .............. *C08K 9/10* (2013.01); *C08K 3/12* (2013.01); *C08K 3/16* (2013.01); *C08K 13/02* (2013.01); *C08K 13/04* (2013.01); *C09K 5/06* (2013.01); *C09K 5/063* (2013.01); *C09K 5/16* (2013.01); *C08L 25/00* (2013.01); *C08L 33/00* (2013.01); *C08L 63/00* (2013.01); *C08L 75/00* (2013.01)

(58) Field of Classification Search
CPC . C09K 5/00; C09K 5/06; C09K 5/063; C09K 5/14; C09K 5/16; C08K 3/0075; C08K 3/10; C08K 3/12; C08K 13/02; C08K 13/04; C08L 63/00; C08L 1/00; C08L 75/00; C08L 33/00; C08L 25/00; C08L 39/06; C08L 83/04; C08L 33/20
USPC .......................................................... 252/71
See application file for complete search history.

(56) References Cited

U.S. PATENT DOCUMENTS

| | | | |
|---|---|---|---|
| 2,388,390 A | 11/1945 | Cook et al. | |
| 3,774,450 A | 11/1973 | Godsey | |
| 3,849,178 A | 11/1974 | Feldman | |
| 3,867,315 A | 2/1975 | Tigner et al. | |
| 4,169,804 A | 10/1979 | Yapel, Jr. | |
| 4,231,885 A | 11/1980 | Rueffel | |
| 4,470,917 A * | 9/1984 | Hawe ................. | C09K 5/063 252/62 |
| 4,504,402 A | 3/1985 | Chen et al. | |
| 4,780,114 A | 10/1988 | Quinn et al. | |

(Continued)

FOREIGN PATENT DOCUMENTS

| | | |
|---|---|---|
| DE | 19954771 | 5/2001 |
| EP | 0087859 | 9/1983 |

(Continued)

OTHER PUBLICATIONS

Freitas, et al., Microencapsulation By Solvent Extraction/Evaporation; . . . , vol. 102, No. 2, pp. 313-332, 2005.

(Continued)

*Primary Examiner* — Jane L Stanley
(74) *Attorney, Agent, or Firm* — Lucas & Mercanti, LLP

(57) ABSTRACT

The invention describes a composite material for heat storage comprising a thermochemical material (TCM) encapsulated in a water vapour permeable polymeric material. The thermochemical material preferably comprises at least one salt, at least one salt hydrate or a mixture of these, wherein the salt is preferably capable of binding water in an exothermic reaction, such as calcium chloride. Encapsulation in a water vapour permeable polymeric material results in an improved stability, cyclability of the thermochemical material, a reduced regeneration temperature and reduced corrosion of the environment. The composite according to the invention is particularly suitable for energy storage, preferably in the field of building and construction, and more preferably in the seasonal storage of solar energy.

8 Claims, 3 Drawing Sheets

(56) References Cited

U.S. PATENT DOCUMENTS

| | | | |
|---|---|---|---|
| 5,785,980 | A | 7/1998 | Mathewson |
| 6,319,599 | B1 | 11/2001 | Buckley |
| 6,465,709 | B1 | 10/2002 | Sun et al. |
| 6,892,478 | B1 | 5/2005 | Erickson et al. |
| 2003/0037677 | A1 | 2/2003 | Boroson et al. |
| 2006/0111001 | A1 | 5/2006 | Kosny et al. |
| 2008/0008858 | A1 | 1/2008 | Hong et al. |
| 2010/0071882 | A1 | 3/2010 | Zhang et al. |
| 2010/0183878 | A1 | 7/2010 | Reezigt et al. |
| 2011/0169179 | A1 | 7/2011 | Gueret et al. |
| 2011/0180751 | A1 | 7/2011 | Rein et al. |

FOREIGN PATENT DOCUMENTS

| | | |
|---|---|---|
| WO | 2007099798 | 9/2007 |
| WO | 2008153378 | 12/2008 |

OTHER PUBLICATIONS

International Search Report issued in PCT Application No. PCT/NL2013/050953.

\* cited by examiner

A

B

COMPOSITE MATERIAL FOR HEAT STORAGE, METHOD FOR PREPARATION AND USE

CROSS-REFERENCE TO RELATED APPLICATIONS

This is a continuation of U.S. patent application Ser. No. 14/654,970, filed Jun. 23, 2015 which is a 371 of PCT/NL2013/050953, filed Dec. 24, 2013, which claims the benefit of European Patent Application No. 12199509.6, filed Dec. 27, 2012 and European Patent Application No. 13173103.6, filed Jun. 20, 2013, the disclosure of each of which is incorporated by reference.

FILED OF INVENTION

The invention relates to thermochemical materials used for storage of thermal energy. In particular, the present invention relates to a composition for heat storage comprising a thermochemical material, a method to prepare the same and to the use thereof in energy storage in for instance the field of building and construction.

BACKGROUND OF THE INVENTION

Thermal energy storage can be used to balance energy demand between day time and night time, or between different seasons such as summer and winter. Water is known to be used for storing solar heat (e.g. using a solar boiler) however this type of heat storage has a low energy density and thus requires a large water tank. Thermochemical materials (TCM) are a more compact way to store heat. The working principle is based on a chemical reaction between two compounds A and B with heat release (exothermic reaction), whereby another chemical compound C is formed. When this C compound is subjected to decomposition by heat during summer, two compounds A and B are formed. In the winter, these two compounds are allowed to react so that the stored heat is released and used for, e.g. building heating or domestic hot water. Apart from their compactness, further benefits include that no thermal insulation is required for the duration of the energy storage.

Especially salt hydrates are promising materials for heat storage. The reaction is then as follows:

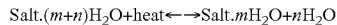

$$\text{Salt} \cdot (m+n)H_2O + \text{heat} \leftarrow \rightarrow \text{Salt} \cdot mH_2O + nH_2O$$

wherein m can be 0 or larger, and n>0. The term thermochemical compound in the context of the present application refers to any of "Salt•$mH_2O$" "Salt•$(m+n)H_2O$", or "Salt". It can thus be either an anhydrate or a hydrate.

A problem of the use of salt hydrates for thermochemical storage is however insufficient physical, mechanical and chemical stability of the material. Stability problems with TCM are, for example, corrosion of the environment, physical structural changes of the material (e.g. flaking off, coagulation, running, pulverization, fracture), chemical structural changes of the material (such as decomposition, leading to corrosion and toxic byproducts). The material should be hygroscopic on one hand, and have a good cyclability (be well regenerable) on the other hand. One of the problems with cyclability is for example melting of the material, or dissolution at uptake of water. Especially hygroscopic deliquescent salts have this problem. Melting and dissolution reduce the bed porosity of the material and thereby the vapour transport through the bed, which decreases the speed of water uptake during repeated uptake of water. Thereby the power input and output of the material are limited. Besides, for instance, pulverization of TCM grains leads to fragments of varying sizes, enabling close packing and lowering the empty volume fraction of the bed and reducing vapour transport.

Also, a problem of some TCM is that they are fully dehydrated (charged) only at very high temperatures, such as over 200° C., which means the use of full capacity of these materials is not possible in conventional applications such as in buildings, greenhouses, etc wherein much lower charging temperatures are employed.

It is therefore desired to provide a TCM that has an improved physical, mechanical and chemical stability. In addition, it is desired to provide a material that has an improved cyclability with respect to water uptake and release. It is also desired to provide TCM that have a low dehydration end temperature and can thus be used in full capacity at lower temperatures, e.g. under 150° C., for solar heat storage in buildings.

SUMMARY OF THE INVENTION

To address one of the foregoing desires, the present invention provides, in one aspect, a composite for heat storage comprising a thermochemical material encapsulated in a water vapour permeable polymeric material.

In another aspect, the present invention provides a method for the preparation of the composite according to the invention, wherein a first solution comprising the thermochemical material and a second solution comprising the polymeric material are prepared, which are subsequently combined and dried, whereby the thermochemical material is encapsulated by the polymeric material.

In a further aspect, the invention provides the use of the composite according to the present invention for energy storage, preferably in the field of building and construction, more preferably in the seasonal storage of solar energy, or for drying of gases in the chemical and medical applications.

DETAILED DESCRIPTION OF THE INVENTION

Figure 1:
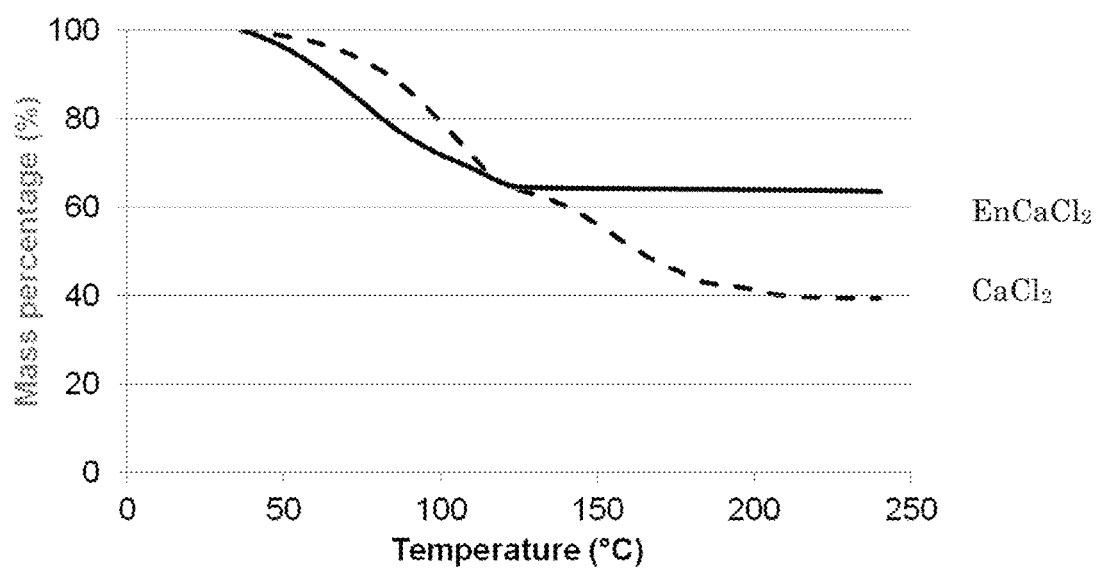
FIG. 1 shows the TGA measurements results of comparative calcium chloride $CaCl_2$ and encapsulated calcium chloride according to the invention $EnCaCl_2$.
Figure 2:
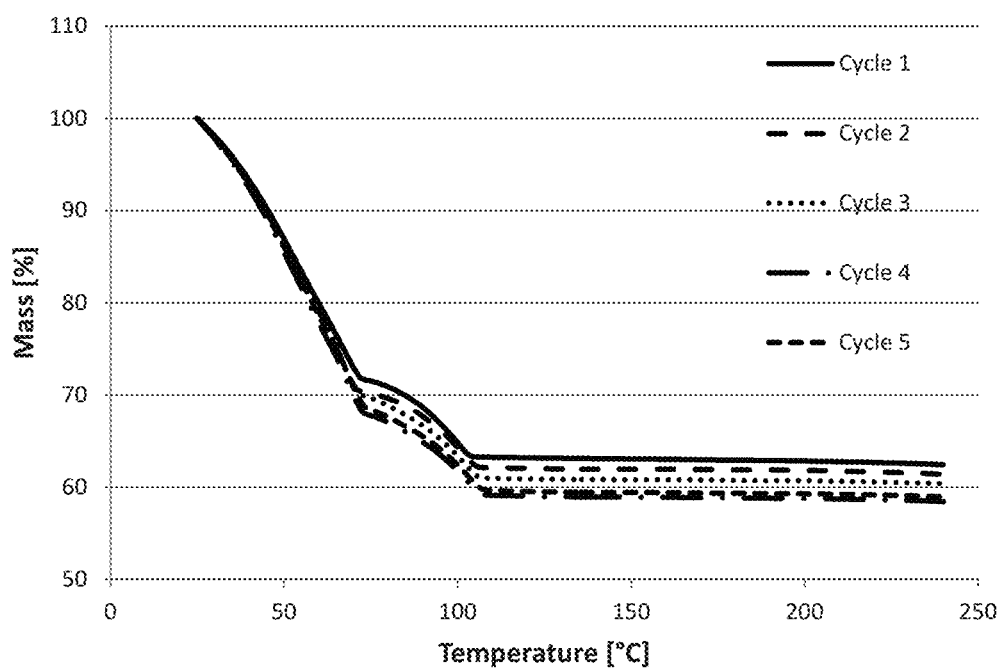
FIG. 2 shows the TGA measurements results of 5 hydration cycles of the encapsulated calcium chloride $EnCaCl_2$ according to the invention.

The present invention is based on the judicious insight that TCM can be encapsulated in water vapour permeable polymers and that as a result, the stability and the cyclability of such materials are improved. Further, the encapsulate obtained is resistant to volume changes caused by water absorbance and release and is more robust during transport. An important improvement is moreover that the dehydration temperature of the encapsulated TCM is significant lower that of the non-encapsulated material, or the dehydration time is shortened at the same dehydration temperature. This means that the encapsulated TCM according to the invention can be used in full capacity at lower temperatures, such as under 150° C., suitable for storage of solar heat in building and construction area. The temperature could for example be lowered to below 100° C., preferably below 50° C.

It is known to encapsulate phase change materials (PCM) with polymers. However, the polymers used for this aim must not be permeable for water or any other substances, since the phase change takes place in a closed system. The present invention relates to encapsulation of thermochemical materials (TCM), in particular salts and salt hydrates, which are coated with a water vapour permeable material so that water vapour can easily reach the TCM in order for the hydration reaction to take place.

According to the invention there is provided a composition being a composite for heat storage that comprises a thermochemical material, said thermochemical material being encapsulated in a water vapour permeable polymeric material.

In a preferred embodiment, the thermochemical material comprises at least one salt, at least one salt hydrate or a mixture thereof. Mixtures of salts, mixtures of salt hydrates, and mixtures of a salt (or salts) and a hydrate (or hydrates) are also possible. Preferably, the thermochemical material is a salt, a salt hydrate or a mixture of these two. Since the thermochemical reaction is based on a reaction with water, it is preferred that the thermochemical material is hygroscopic. Deliquescent salts can be used since the encapsulation can prevent formation of lumps of the crystals upon dissolution and subsequent drying because the salt solutions created inside the capsule cannot fuse together to larger solution droplets (which can form larger crystals). In one embodiment of the invention, the TCM is not deliquescent.

In order to be used as a thermochemical material, the salt is preferably capable of forming a hydrate. The salt hydrate present as the thermochemical material can be a full hydrate (i.e. cannot bind any more water), or be a hydrate that is capable of forming a further hydrate, or a mixture of these. The thermochemical material can also comprise a mixture of a salt and a hydrate, or several hydrates. The salt and the hydrate can independently from each other be in the amorphous or in the crystalline state. Preferably, the thermochemical material is encapsulated in a hydrate form, and more preferably, as a full hydrate, as these are typically larger in volume than a corresponding anhydrate. In case of a hydrate being encapsulated, the polymeric casing is already adjusted to the maximum volume of the thermochemical material. This prevents rupture during hydration cycles which are associated with volume changes.

The TCM used in the present invention is preferably capable of binding water in an exothermic reaction. This means that the thermochemical material has a negative standard enthalpy of hydration $\Delta H°_{hyd,298}$. The standard enthalpy of hydration for the whole reaction from the anhydrate to a maximal possible hydrate is preferably lower than −300 kJ/mol, more preferably lower than −350 kJ/mol. The term "lower" with respect to enthalpy of hydration means "more negative". The values of the standard enthalpy of hydration are obtained from the NBS tables of chemical thermodynamic properties, published by the American Chemical Society and the American Institute of Physics for the National Bureau of Standards, Washington D.C., 1982.

Preferably, the TCM used in the present invention is selected from the list consisting of a chloride, bromide, iodide, sulfide, sulfate, carbonate, bicarbonate, phosphate, hydroxide, hydrates thereof and combinations thereof. Inorganic salts are preferred. Salts and salt hydrates particularly suitable in the present invention to be encapsulated are preferably one of the following: magnesium sulfate $MgSO_4$ or a hydrate thereof, such as $MgSO_4.H_2O$, $MgSO_4.6H_2O$, $MgSO_4.7H_2O$, aluminium sulfate or a hydrate thereof such as $Al_2(SO_4)_3.18H_2O$, magnesium chloride or a hydrate thereof, such as $MgCl_2.6H_2O$, calcium chloride or a hydrate thereof such as $CaCl_2.2H_2O$, $CaCl_2.6H_2O$, sodium sulfide or a hydrate thereof such as $Na_2S.5H_2O$, strontium bromide or a hydrate thereof such as $SrBr_2H_2O$, $SrBr_2.6H_2O$, calcium sulfate or a hydrate thereof such as $CaSO_4.2H_2O$. Preferably, thermochemical material is selected from sodium sulphide, magnesium chloride, magnesium sulphate, calcium chloride, calcium sulphate, strontium bromide or a hydrate of any of these or a mixture of these.

The thermochemical material can further be present as a mixture with additives, for example, organic or inorganic inhibitors. The inhibitors may for example influence the morphology or the crystal structure of the thermochemical material. Mixtures of inhibitors can also be used. In a preferred embodiment, a crystallization inhibitor is used. Such inhibitor inhibits crystal growth which allows to obtain particles with a smaller particle size.

In a preferred embodiment, the thermochemical material has a high energy storage density. The theoretical (thermodynamic) energy storage density is defined as the reaction enthalpy (in this case hydration enthalpy) per volume unit of the TCM. It is preferred to use thermochemical materials that have a thermodynamic energy storage density at least 1 $GJ/m^3$, more preferably at least 1.5 $GJ/m^3$, yet more preferably at least 2 $GJ/m^3$. The energy storage density should in any case be higher than that of water when water is used to store heat (0.2 $GJ/m^3$), more preferably at least 0.5 $GJ/m^3$, yet more preferably at least 0.8 $GJ/m^3$. The theoretical energy storage density includes the evaporation enthalpy of water. The values of energy storage density are obtained from the NBS tables of chemical thermodynamic properties, published by the American Chemical Society and the American Institute of Physics for the National Bureau of Standards, Washington D.C., 1982. The energy density of some salts is given in Table 1.

TABLE 1

| Name | Dissociation reaction (A + B → C + heat) | | | Energy density [$GJ/m^3$] |
| --- | --- | --- | --- | --- |
| | A | B | C | |
| Sodium sulfide | $Na_2S \cdot 0.5H_2O$ | $4.5H_2O$ | $Na_2S \cdot 5H_2O$ | 2.9 |
| Magnesium chloride | $MgCl_2$ | $6H_2O$ | $MgCl_2 \cdot 6H_2O$ | 3.1 |
| Magnesium sulphate | $MgSO_4$ | $7H_2O$ | $MgSO_4 \cdot 7H_2O$ | 2.8 |
| Calcium chloride | $CaCl_2$ | $6H_2O$ | $CaCl_2 \cdot 6H_2O$ | 2.8 |
| Calcium sulphate | $CaSO_4$ | $2H_2O$ | $CaSO_4 \cdot 2H_2O$ | 1.4 |
| Calcium chloride | $CaCl_2 \cdot H_2O$ | $H_2O$ | $CaCl_2 \cdot 2H_2O$ | 0.6 |

It should be noted that in practice, formation of higher hydration states is limited by operation temperature and pressure during the reaction, according to the Clausius-Clapeyron equation describing thermal equilibrium. For instance if $CaCl_2$ is used as TCM, at about 33 mBar water vapour pressure and 90° C., $CaCl_2.2H_2O$ is the equilibrium state, while at about 13 mBar and 40° C., $CaCl_2.6H_2O$ is the equilibrium state. These realistic operating conditions for dehydration and hydration define the effective stored energy density, which is for this reaction about 1 $GJ/m^3$.

According to the present invention, the thermochemical material is encapsulated in a matrix of a polymeric material. Encapsulation means that a granule or granules (e.g. nanoparticles) of TCM are surrounded by the polymer. Particularly, the TCM (or a mixture of TCM with the polymeric material) may form a core, or cores, covered with a shell of the encapsulation material (core-shell structure) and be in a particulate form, or that the granules of the TCM may be dispersed, or immobilised, in a polymer matrix of the encapsulation material, or a combination of these. In the former case, the thermochemical material forms a core and the polymeric material forms a shell around the core; also multiple cores covered with a shell are possible. In the latter case, the polymeric material is the continued phase; the encapsulate can have a form of a sheet, a layer or a film. Examples of different encapsulation morphologies are "spaghetti with meatballs" (wherein spaghetti stands for the polymer matrix and meatballs for the TCM material) and "ravioli" (core-shell structure), or a combination of these morphologies. In any case, the polymeric material encloses the TCM. The particular structure of the encapsulated material may depend on the ratio of the amounts of the TCM to the encapsulation material and can be investigated using microscopy techniques, e.g. SEM, TEM.

The encapsulation material used in the present invention is polymeric, i.e., comprises one or more polymers. Polymers are macromolecules comprising repeating units, which can be of one (homopolymers) or more (interpolymers) sorts. In the present invention, homopolymers, interpolymers and mixtures of those can be used, of both natural and synthetic nature. Yet in a preferred embodiment, biopolymers are used. Biopolymers represent a more sustainable polymer source than synthetic polymers and their production is less harmful for the environment.

Preferably, the polymer material used in the present invention has a low water absorption capacity itself. Particularly preferred are hydrophobic polymers. Hydrophobic polymers do not absorb and hold water. Under "hydrophobic polymer" a polymer is understood that takes up less than 1 wt. % of water at 25° C. Preferably, the polymeric material used in the present invention absorbs less than 1 wt. % after 1 h of full immersion at 23° C. (e.g. measured according to ASTM D-570-81). More preferably, the polymeric material used in the present invention absorbs virtually no water.

The polymeric material should, however, be permeable for water vapour and preferably impermeable for liquid water in order to allow the encapsulated composite effectively absorb and hold water vapour. It is preferred that the polymeric material is impermeable for salt ions. In a preferred embodiment, the polymeric material has a water vapour permeability of at least $1,000 \times 10^{-13}$ $cm^3 \cdot cm/(cm^2 \cdot s \cdot Pa)$ and, more preferably, at least $4,000 \times 10^{-13}$ $cm^3 \cdot cm/(cm^2 \cdot s \cdot Pa)$ at 0° C., 1 atm. Good results are achieved in the range from 6,000 to $40,000 \times 10^{-13}$ $cm^3 \cdot cm/(cm^2 \cdot s \cdot Pa)$ at 0° C., 1 atm. The water vapour permeability is determined by ASTM E96 Water method. Some data on water vapour permeability of different polymers is described in Polymer Handbook, 4th edition, Wiley, New York (1999), Chapter Permeability and Diffusion Data (by S. Pauly), pp. VI/543-VI/562. In an alternative embodiment, the water vapour permeability of the polymeric material is higher or equal to the water vapour permeability of poly(isoprene) as measured by the ASTM E96 Water method.

Preferably, the polymer used is a polyolefin, an ether, and/or contains —OH (hydroxyl) groups. Under polyolefins polymers are understood obtained by the polymerisation of a double C—C bond in a monomer. Under ethers polymers are understood containing —O— bond. Suitable polymers are, for example, polyacrylate, polymethacrylate, polyvinylpyrrolidone, polyurethanes, polyepoxides, poly(ethyl) methacrylate, poly(isoprene), polysiloxane (preferably vulcanised), poly(trifluoropropyl siloxane), cellulose, methylcellulose, ethylcellulose, cellulose acetate, cellulose nitrate, poly(oxy-2,6-dimethyl-1,4-phenylene), polystyrene, poly(acrylonitrile), or a copolymer of these, or a mixture of these.

More preferably, the polymer is a biopolymer or a derivative thereof. Particularly preferred is cellulose or a cellulose derivative such as methylcellulose, ethylcellulose, cellulose acetate, or cellulose nitrate. Very good results are achieved with ethylcellulose. This material combines a good water vapour diffusion and a good liquid water barrier and ion barrier. Furthermore, it has a good processability and can readily be applied, e.g., in spray drying techniques.

The encapsulated composite according to the invention preferably comprises at least 30 wt. % of TCM, more preferably at least 50 wt. %, yet more preferably at least 70 wt. %, more preferably at least 80 wt. % and most preferably at least 85 wt. %, based on the total weight of the composite. In an alternative embodiment, the encapsulate composite may comprise from 10 to 90 wt. % of the TCM, and more preferably from 30 to 80 wt. %, yet more preferably the TCM is present in an amount of 40-70 wt. % in the composite of the invention. The TCM content is calculated here as the anhydrous salt equivalent.

Preferably, the composite is in a granulate form, or in the form of a film. In the granulate form, the composite, in one embodiment, preferably has a particle size in the range 10-500 micrometer, more preferably, in the range 20-400 micrometer and yet more preferably, in the range of 50-200 micrometer. In any case, the particle size is preferably not greater than 2 mm, more preferably not greater than 1 mm. The particle size refers to the diameter of the particles and can be determined with optical microscopy by measuring the diameter from a micrograph. The desired size can be selected by choosing an encapsulation method and tuning of the process parameters and ratio of the different materials (TCM and additives) used.

The TCM material itself can comprise a plurality of particles. In total, the particle size of the TCM material is preferably in the range 1 nm to 2000 micrometer. More preferably, the particle size is at least 10 nm. It is however preferred that such (nano)particles have a particle size of less than 20 micrometer, more preferably less than 15 micrometer, yet more preferably less than 10 micrometer. Particularly preferred, the particle size is 1 micrometer or less since this is beneficial for the efficient reaction between water vapour and TCM. This may lead to the reduction of the dehydration temperature, or to the shortening of the dehydration time at the same temperature. The small particle size of the TCM material is therefore necessary to achieve the advantageous hydration and dehydration behavior.

The TCM particles within the composite of the invention can also be characterized with respect to their average particle size. The term "average particle size" as used in this application is meant to refer to the mean average diameter of the particles. The average particle size may be determined by measuring the diameter of a representative number of particles (such as 100) from a micrograph and calculate the average. Further details concerning techniques for measuring the average particle size of the particles are known to those skilled in the art.

The average particle size of the TCM within the composite of the invention is preferably below 100 micrometer, more preferably below 50 micrometer, even more preferably below 20 micrometer, yet more preferably below 10 micrometer. Most preferably the average particle size is below 5 micrometer, and even more preferably below 1 micrometer. The average particle size is preferably at least 10 nm.

As to the composite, the average particle size of the composite particles is preferably not greater than 2 mm, more preferably not greater than 1 mm. In a preferred embodiment, the average particle size is less than 500 micrometer, preferably less than 400 micrometer, yet more preferably less than 200 micrometer. The minimum average particle size is preferably 1 micron.

In a preferred embodiment, the composite further comprises additives, e.g. to provide for electrical and/or heat conductivity, such as a metal, graphite or carbon nanotubes. This provides a composite with a good heat conductivity which is an advantage in thermochemical applications wherein heat transport is one of the important parameters. Preferably, the composite comprises graphite or carbon nanotubes.

Without wishing to be bound by any theory, it is believed by the inventors that the encapsulation of the TCM in a polymer matrix according to the invention prevents the TCM and absorbed moisture from leaking out while maintaining excellent absorbing properties. The encapsulation could also provide for the TCM being less sticky and forming less lumps upon hydration. This makes the material easy to handle and to transport. Moreover, the TCM maintains its high absorbing speed after several regeneration cycles. The loss in absorbing speed in the present case can be as low as not more than 10% after at least 5 regeneration cycles. In addition, more moisture can be absorbed by the encapsulated TCM than by a non-encapsulated sample of the same TCM without loosing its shape. Loss of shape can for example take place due to liquefaction of the TCM upon water uptake. The encapsulated TCM according to the invention maintains its shape upon hydration of the TCM.

The dehydration of the encapsulated TCM of the invention was shown to be faster at a certain temperature and relative humidity compared to non-encapsulated TCM. It could also be possible that the maximum hydration temperature of the encapsulated TCM according to the invention is lowered due to encapsulation. This leads to an easier regeneration of the TCM composite, and within the same time frame, a lower dehydration temperature can be used for dehydration. Time of dehydration can be important in some applications of the used heat.

This broadens the range of materials that can be used in lower temperature applications. For example, the present invention makes it possible to use thermochemical materials that require a very high dehydration temperature, or a very long dehydration time at lower temperatures, such as calcium chloride (220° C.), in solar heat storage wherein the temperature is limited to 150° C. *maximum* due to conventional vacuum tube collector systems, and the time is limited due to efficacy of the reactor.

Encapsulation of TCM in a polymeric material to form a composite material according to the present invention has also a number of advantages not achieved in the prior art.

Existing solutions of the corrosion problem of the environment are, for example, coating of the material of the environment, or selecting non-corrosive materials. A problem with non-corrosive materials is that they often have a lower energy storage density, an order of magnitude lower is possible. In the present invention, the TCM is enclosed in a shell or matrix of a water vapour permeable polymer material, which decreases contact with the environment. The encapsulation also results in that the ion exchange with the environment is limited and thus corrosion is decreased. Including heat conducting additives such as metal or graphite particles, the TCM-composite has an increased thermal conductivity with respect to the composites in which these thermal conductivity enhancing components have not been included.

Existing solutions for improving heat conductivity and vapour transport require extremely thin TCM layers that should be in direct contact with the vapour supply lines and channels for the cooling medium of the heat exchanger. The present invention does not have this disadvantage; the encapsulated TCM has an improved heat transport.

At the same time, polymers provide physical stability, firmness and resistance against volume changes. The TCM composite of the invention is mechanically stronger than pure TCM, which prevents damage of the material at volume changes and during transport. Encapsulation also prevents coagulation, flaking off, running, pulverization and fracture of the material. Encapsulation also results in a larger contact surface area of the TCM, thereby increasing the absorption velocity of water vapour.

In a further aspect, the present invention relates to a method for the preparation of the composite according to the invention. According to the method, either the thermochemical material and the polymeric material are combined in a liquid phase (e.g. in a solution, dispersion or emulsion) and subsequently dried, or the thermochemical material is combined with a monomer of the polymeric material, followed by the polymerization of the monomer, whereby in both cases the thermochemical material is encapsulated by the polymeric material.

In one preferred embodiment, a first solution (or dispersion, or emulsion) comprising the thermochemical material and a second solution (or dispersion, or emulsion) comprising the polymeric material are prepared, which are subsequently combined and dried, whereby the thermochemical material is encapsulated by the polymeric material. Where applicable, instead of a solution or a dispersion, also emulsions can be used. This is particularly important for certain TCMs that can be molten at relatively low temperatures; if these are mixed with hydrophobic monomers or solvents, an emulsion can be formed.

It is also possible to effect encapsulation by in-situ polymerization of a suitable monomer in the presence of the thermochemical material. In this embodiment, the thermochemical material is dissolved or dispersed in the monomer, which is then polymerized to form the thermochemical material encapsulated by the polymer. This embodiment can thus be carried out without the presence of solvents. Polymerization can be performed with any suitable polymerization method, e.g. thermally or using the UV light. Preferably, the TCM to be encapsulated is dissolved (or dispersed) in a first solvent, which is preferably water, while the encapsulating polymeric material is dissolved in a second solvent, which is miscible with the first solvent. The first and second solvents can be different, or the same. In one embodiment, a solution comprising both the thermochemical material and the polymeric material is prepared, which is subsequently dried, whereby the thermochemical material is encapsulated by the polymeric material.

Preferably, the second solvent is water or a solvent miscible with water. In one embodiment, both solvents are water and thus aqueous solutions of both TCM and the polymeric material are used. In another, more preferred embodiment, an alcohol such as ethanol is used as a solvent for the polymeric material. Particularly preferred is the embodiment, wherein the TCM is dissolved in water and the polymeric material, preferably a cellulose derivative, is dissolved in ethanol. The resulting solutions are combined to form a solution comprising both the TCM and the encapsulating material, which is then dried whereby the thermochemical material is encapsulated by the polymeric material. Upon drying, preferably a homogenous film material or particles are formed wherein the TCM is included in the polymeric material.

In an alternative embodiment, the second solvent is not miscible with the first solvent. This is for example used in core-shell capsule printing technique.

Encapsulation can be effected by known encapsulation techniques such as spray drying, solvent-non solvent polymer demixing, fluid bed encapsulation, 'blending and milling', print-drying, core-shell capsule printing, pelleting or sol-gel processing, or a combination of these. The polymeric material can also be prepared by in-situ polymerization, in this case the encapsulation can be effected by interfacial polymerization (in-flight).

During the encapsulation, it may be necessary to control the particle size of the TCM in the formed composite. In some cases care should be taken that the TCM particles have the preferred particle size, e.g. less than 20 micrometer. A skilled person is aware of methods to control the particle size in each particular technique. For example, where spray drying or other relatively "fast" crystallization technique is used, usually no special measures are needed since the obtained particle size is relatively small and usually within the desired range. In case methods are used with "slow" crystallization, e.g. in situ polymerization, it may be necessary to use suitable additives, for example, organic or inorganic inhibitors. The inhibitors may for example influence the morphology and/or crystal size of the particles of the thermochemical material. In a preferred embodiment, a crystallization inhibitor is used. Such inhibitor inhibits crystal growth which allows to obtain particles with a smaller particle size. A skilled person is able to choose a suitable inhibitor for each TCM.

Preferably, the encapsulation is performed by the core-shell capsule printing, by print-drying, or by spray drying. In the latter method a solution comprising both the TCM and the encapsulation polymeric material is spray-dried. In a typical procedure, by spraying a solution through a pressure nozzle, a spray jet is created comprising small sized droplets. These droplets are contacted with a heated air flow, during which process the solvent(s) evaporates. After the evaporation stage the resulting microcapsules are transported with the air flow into a separation unit (filter or cyclone) where they can be collected. Spray drying is particularly preferred because it results in relatively small TCM particles without the need to use crystal growth inhibitors.

In a further aspect, the invention presents the use of the encapsulated TCM according to the invention for energy storage, preferably in the field of building and construction. The use of thermochemical materials is advantageous over phase change materials because with TCM there are no thermal losses during storage, while for PCT the material needs to be stored at an elevated temperature and the set-up should be thermally insulated. These differences are crucial to the application of seasonal heat storage and loss-free heat transport. Also, TCM allow much higher storage densities because evaporation processes are involved instead of melting (PCM).

Particularly preferred use is in seasonal storage of renewable energy such as solar energy. Another preferred use is in mobility application such as pre-heating car engines in cold climate, heating car inside in e.g. electric cars. Furthermore, heat transport associated with long time and long distances is very favorable using the encapsulated TCM of the invention, because it is loss-free and compact.

Another application is the storage of industrial waste heat. The material of the invention can further be applied in greenhouse farming, e.g. for temperature and/or moisture control. In general, heat storage by TCM is attractive if a relatively large amount of heat must be stored in a small volume, and for a relatively long time, e.g. for seasonal storage. The composite can also be used for drying of gases in the chemical and medical applications.

The invention will now be demonstrated in the following, non-limiting examples.

Example 1

Preparation $EnCaCl_2$ (70 wt. % and 50 wt. %)

Ethylcellulose std 10 (15 g) was dissolved by adding the material to a stirred vial containing ethanol (225 g). $CaCl_2.2H_2O$ (35 g) was dissolved in a mixture of deionized water and ethanol (100 and 150 g respectively). The calcium chloride solution was added to the stirred solution of ethylcellulose to obtain a slightly hazy light yellow solution. Spray drying has been done using a Büchi Mini Spray Dryer B-290. The spray-dry settings: inlet T 170° C., aspirator 75%, pump 10%, nozzle cleaner 4, nozzle-flow 25 mL/min. After equilibration of the temperature, the flush solvent (1:5 water:ethanol) is switched for the calcium chloride-ethylcellulose solution. A fluffy powdery product $EnCaCl_2$ (70%) was collected from the cyclone and collector reservoir, yield: 30 g white powder. The SEM photos revealed the TCM particle size to be under 10 micrometer.

$EnCaCl_2$ with 50 wt. % calcium chloride was prepared in an analogous way. From the SEM photos it was possible to determine that the TCM particle size is under 10 micrometer.

Example 2

Thermo-gravimetric analysis (TGA) and differential scanning calorimetry (DSC) measurements were performed on 50:50% w/w encapsulated $CaCl_2$ (named $EnCaCl_2$) and on $CaCl_2$. For the tests 100 µL aluminum holders were used.

DSC measures the energy which is released or needed in the sample as a function of temperature, in order to keep the sample at the same temperature level as the reference cell. In TGA a mass-response is obtained as a function of temperature, e.g. due to evaporation of water from the compound. 100% is the starting mass fraction, any changes occurring during a temperature sweep can be recorded.

The first TGA characterization of the thermal behavior of $CaCl_2$ was performed from 25° C. up to 550° C. at 10 K/min in a flow of 50 mL/min dried $N_2$-atmosphere. It was shown that all water had been evaporated by 240° C., and the remaining dry $CaCl_2$ remains stable up to 550° C.

In the TGA curve (see FIG. 1) it can be seen that upon increasing temperature, the $CaCl_2$-sample loses weight. This is due to the evaporation of crystal water from the sample. Total weight-loss is about 62% at 240° C.

The 50:50 $EnCaCl_2$ sample was analyzed under the same conditions as $CaCl_2$. Water evaporation finishes around 120° C., reaching 36% mass-loss for 50:50 $EnCaCl_2$. Because half of the material consists of ethylcellulose polymer, this amounts to a total mass-loss of $CaCl_2$ of 72%, roughly comparable to the total mass-loss of pure $CaCl_2$. In a separate experiment it was shown that around 330° C. the ethylcellulose decomposes (evident from the mass-loss as compared to the remaining mass at high temperature: a 50:50 ratio emerges).

From the above experiments the following can be deduced as follows. $CaCl_2$ dehydrates up to at least 220° C. At higher temperatures, $CaCl_2$ does not dehydrate anymore but remains stable. $EnCaCl_2$ dehydrates at a temperature from 60 up to 120° C. From 130 up to 240° C. it is stable and at even higher temperatures it decomposes. Therefore, $EnCaCl_2$ dehydrates at significantly lower temperatures than $CaCl_2$.

Example 3

Cycling behavior of one sample of $EnCaCl_2$ after dehydration and rehydration in 5 successive times was tested under the same conditions as in Example 1. The differences in final mass % may come from slight differences in total hydration since the curves have been recalculated to start from 100% mass every cycle.

The experiment shows that dehydration and rehydration was possible up to 5 cycles without noticeable deterioration. In addition, the possibility to store thermal energy remained.

Example 4

Figure 3:
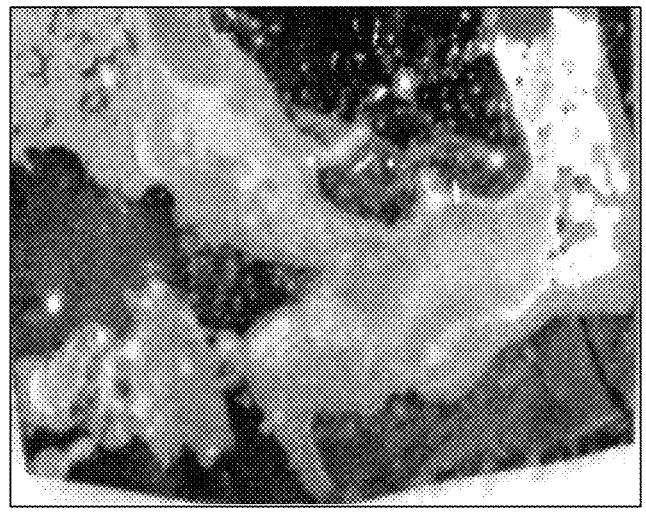
FIG. 3 shows the corrosion on a copper plate after the use of comparative calcium chloride $CaCl_2$ (A) and encapsulated calcium chloride $EnCaCl_2$ according to the invention (B).
Figure 3:
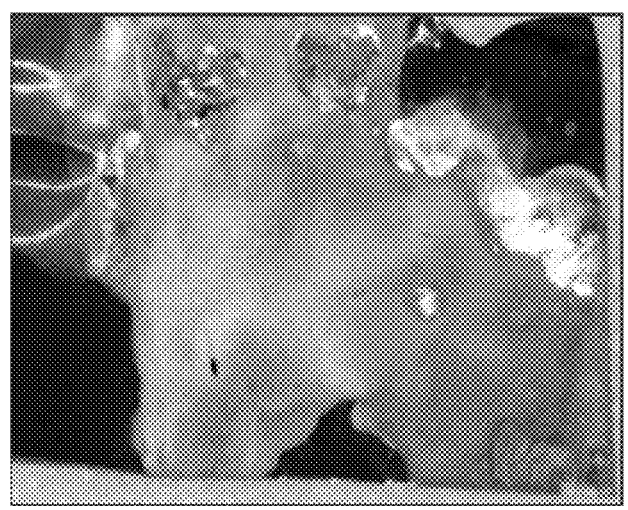

Finally, the investigation of $EnCaCl_2$ after 5 cycles under the optical microscope shows that it causes less corrosion towards copper (FIG. 3B) than not encapsulated $CaCl_2$ (FIG. 3A). The corroded parts of copper are visible in FIG. 3 as the darkest parts. The intensity of the dark colour is not indicative for the corrosion degree. FIG. 3B shows a higher surface of the non-corroded copper (light parts) than on FIG. 3A. This evidences that by encapsulation the ion transport $CaCl_2$ to the environment and, as a consequence, corrosion of the environment are limited.

The invention claimed is:

1. A method of releasing heat stored in a composite material, wherein the composite material comprises a thermochemical material and a coating of a hydrophobic water vapour permeable polymeric material encapsulating said thermochemical material, and wherein the water vapour permeable polymeric material is impermeable for liquid water and is cellulose or a cellulose derivative, wherein the method comprises:
   allowing water vapor to reach the thermochemical material through said coating, and
   reacting said thermochemical material with water vapor thereby releasing heat.

2. The method of claim 1, wherein the composite material comprises at least 80 wt % of the thermochemical material.

3. The method of claim 1, wherein the composite material comprises at least 30 wt % of the thermochemical material.

4. The method of claim 1, wherein the composite material further comprises metal, graphite or carbon nanotubes.

5. A method of storing and releasing energy in a composite material,
   wherein the composite material comprises a thermochemical material and a coating of a hydrophobic water vapour permeable polymeric material encapsulating said thermochemical material, wherein the polymeric material is impermeable for liquid water,
   wherein the method comprises:
      a heat storage step comprising dehydrating said thermochemical material with heat to store heat,
      a step of storing the dehydrated composite material, and
      a heat releasing step comprising:
         allowing water vapor to reach the dehydrated thermochemical material through said coating, and
         reacting said dehydrated thermochemical material with water vapour to release heat.

6. The method of claim 5, wherein the heat storage step is carried out during summer at a temperature below 150° C. and the heat releasing step is carried out during winter.

7. The method of claim 5, wherein the thermochemical material comprises at least one salt, at least one salt hydrate, or a mixture of these, and wherein the polymeric material has a water vapour permeability of at least $1,000 \times 10^{-13}$ $cm^3 \ast cm/(cm^2 \ast s \ast Pa)$ at 0° C. and 1 atm, and does not absorb and hold water.

8. The method of claim 5, wherein the heat releasing step is performed in an electric car.

* * * * *